(12) United States Patent
Craig et al.

(10) Patent No.: US 10,841,634 B2
(45) Date of Patent: Nov. 17, 2020

(54) MANAGING CODE FOR VERIFYING VIEWING AND ENGAGING WITH DIGITAL CONTENT

(71) Applicant: HTMA Holdings, Inc., Ann Arbor, MI (US)

(72) Inventors: Kathleen Craig, Dexter, MI (US);
Brian Matteson, Chelsea, MI (US);
Justin Morton, Dexter, MI (US);
Nancy Benovich Gilby, Brighton, MI (US)

(73) Assignee: HTMA Holdings, Inc., Ann Arbor, MI (US)

( * ) Notice: Subject to any disclaimer, the term of this patent is extended or adjusted under 35 U.S.C. 154(b) by 0 days.

(21) Appl. No.: 16/231,091

(22) Filed: Dec. 21, 2018

(65) Prior Publication Data

US 2019/0200061 A1    Jun. 27, 2019

Related U.S. Application Data

(60) Provisional application No. 62/609,418, filed on Dec. 22, 2017.

(51) Int. Cl.
*H04N 21/2547* (2011.01)
*H04N 21/442* (2011.01)
*H04N 21/431* (2011.01)
*H04N 21/81* (2011.01)

(52) U.S. Cl.
CPC ..... *H04N 21/2547* (2013.01); *H04N 21/4316* (2013.01); *H04N 21/44222* (2013.01); *H04N 21/812* (2013.01)

(58) Field of Classification Search
CPC ......... H04N 21/2547; H04N 21/44222; H04N 21/4316; H04N 21/812
See application file for complete search history.

(56) References Cited

U.S. PATENT DOCUMENTS

| | | | |
|---|---|---|---|
| 2008/0221986 A1* | 9/2008 | Soicher | G06Q 30/02 705/14.36 |
| 2011/0004517 A1 | 1/2011 | Soto et al. | |
| 2013/0090986 A1 | 4/2013 | Casinelli et al. | |
| 2014/0257919 A1* | 9/2014 | Forman | G06Q 30/0201 705/7.29 |

OTHER PUBLICATIONS

PCT International Search Report and Written Opinion, PCT Application No. PCT/US2018/067345, dated Apr. 1, 2019, 10 pages.

* cited by examiner

*Primary Examiner* — Yassin Alata
(74) *Attorney, Agent, or Firm* — Fenwick & West LLP (57) ABSTRACT

An online system receives requests to present content to users. The online system adds a code to the content that provides an indication to users that the content may be eligible for compensation when a user interacts with the content and the code directing the user's device to the online system. When the user interacts with the content, the user device accesses the online system, which authenticates the user's identity. Users may then receive a payment or micropayment from the online system for interacting with the content item. The online system may provide such payments for many types of content from various sponsors, such that the online system provides content with a code for various content and permits the online system to preserve user privacy while presenting such content.

15 Claims, 4 Drawing Sheets

MANAGING CODE FOR VERIFYING VIEWING AND ENGAGING WITH DIGITAL CONTENT

CROSS REFERENCE TO RELATED APPLICATION

This disclosure claims the benefit of U.S. Patent Application No. 62/609,418, filed Dec. 22, 2017, the entirety of which is hereby incorporated by reference in its entirety.

BACKGROUND

This disclose relates generally to online content management systems, and more specifically to a centralized online content management system for viewing content from various third-party content providers.

Online content, particularly content with sponsorship, increasingly compete for user engagement, can become particularly intrusive in an ever-increasing attempt to seize the consumer's attention. Many approaches adversely impact user experience by interrupting a user, may obfuscate the presented content, and may risk exploitation of personal data. These types of approaches harm presentation of content and diminish the effectiveness of presenting content to users. Even when a user may wish to view the content, the user may nonetheless decline to elect to view such content when other content is available.

Additionally, the financial requirements of presenting sponsored content generally increases over time. The information costs of a consumer's attention have risen and may continue to do so when content is presented that unduly interrupts user attention. In addition, a significant portion of reported digital content traffic is the activity of digital robots clicking on content. Trust between consumers, content hosts, advertising networks, and merchants is damaged, which in turn inhibits interactions. All parties involved require a solution to make content distribution, in particular for sponsored content, a more trusted and equitable environment and to avoid fictitious traffic.

Furthermore, tracking views and accumulating information in an attempt to provide relevant content to consumers gives the consumers the impression of invaded privacy. Increasingly, social media platforms and other online systems are tracking and storing the activity of online users to sell to advertisers. There is a need for a system that connects consumers to relevant content while protecting their sensitive information.

SUMMARY

An online system enables the payment of a plurality of users in exchange for interacting with content from a plurality of content sponsors. The content may include educational material, advertisements, or other content of interest to users. The online system provides a trusted and centralized mechanism for disseminating information. The online system may be associated with (or operate as) a financial institution that verifies the identity of users in association with particular accounts. Content may be provided to users in conjunction with financial payment to users to encourage user interaction with content. For example, educational systems may sponsor user learning and engagement by providing sponsored material to users. Content sponsors may also have assurance that their funds are directly linked to user interactions. At the same time, users can trust that their privacy is being protected.

The online system connects a set of users with a set of content sponsors, each of which have an account and access the online system, for example via a web portal, mobile application, or voice application. The online system receives content from a content sponsor as well as monetary funds to finance the sponsorship of the content. The monetary funds may be received directly from the content sponsor or from the financial institution of the content sponsor into a financial account of the user. In some embodiments, the financial account is a fully compliant savings, checking, investment, loan, or other type of banking account that verifies user identifies. The content and funds may be stored by the online system or the online system may coordinate presentation of the content and direct funds to the user. The content sponsor may send additional information to the online system, such as targeting criteria, a specified amount of funds to pay per user interaction, a threshold number of users who will be paid for interacting with the content, an evaluation for a user to complete prior to receiving funds, their risk reward threshold, or any other supplemental information.

Users create accounts with a financial institution associated with the online system with one or more mechanisms for verifying the identity of the user. A user logs-on to the online system and requests content with which to interact. The online system provides a content item from the store of sponsored content for display to the user with an indicator that the content is eligible for direct compensation for interacting with the content. The online system generates a code for inclusion with the content item, wherein the code represents information provided by the content sponsor about the content item. The code is used to generate the indicator, which is displayed along with the rendering of the content item. The indicator may convey information to the user such as whether the content is available for interaction and how much will be paid for the interaction.

The user can interact with a particular content item. Upon interacting with the content item, the user is paid monetary funds. The value may vary depending on the sponsor and type of content, and may include comparatively large or small payments, including micropayments. Prior to receiving the funds, the user may be required to verify their identity to the online system. Similarly, the user may be required to complete an evaluation, such as a quiz on the content, prior to receiving the funds. Such measures prevent scamming by bots or other fraudulent parties.

The funds accumulated by the user are stored within the user's account. A user's account is connected to a financial institution, such that funds can be deposited into the user's financial account. A threshold may also be established for the user to deposit the user's funds to the user's financial account. The threshold may be a time or value threshold (or both) and may be selected by the user. The threshold may represent a risk/reward selection by the user to encourage the user to save or accrue value, for example to encourage positive financial practices by the user. In some embodiments the funds may be accessed before the threshold, but may be associated with a penalty. In addition, in various embodiments when the threshold is reached the user also receives a reward that may increase the value of the received funds. In this case, reaching the threshold thus also receives a reward that increases the value provided to a user. In various embodiments, the system may set the threshold for a user, and in other embodiments the user may select a threshold from a range of thresholds, each of which may be associated with different rewards or penalties.

DETAILED DESCRIPTION

System Architecture

Figure 1:
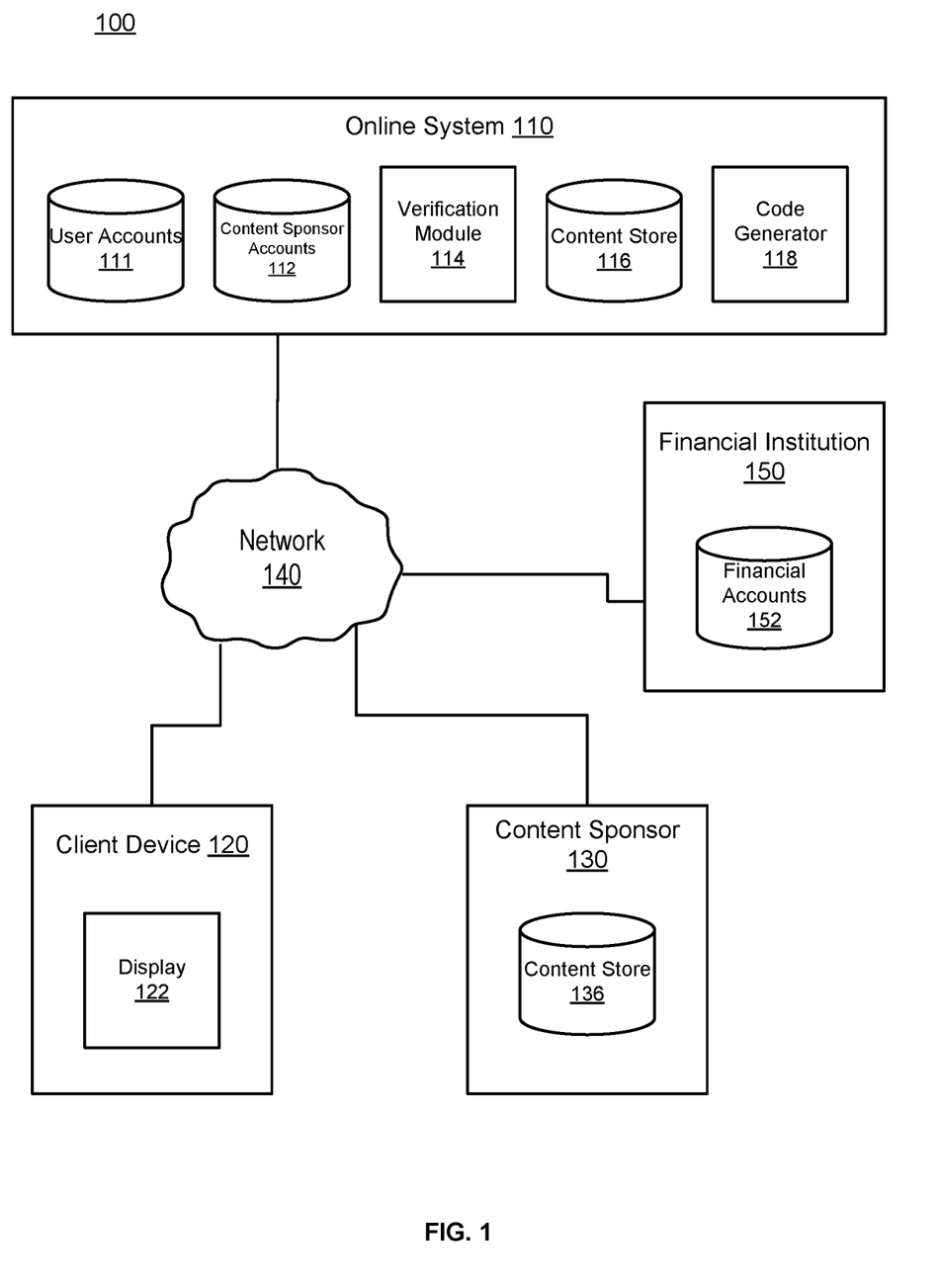
FIG. 1 is a block diagram of a system environment which connects an online system, client device, content sponsor, financial institution, and network, according to one or more embodiments.

FIG. 1 is a block diagram of a system environment 100 having an online system 110, client device 120, content sponsor 130, financial institution 150, and network 140, according to one or more embodiments. The client device 120, content sponsor 130, and financial institution 150 are connected to the online system 110 via the network 140.

The client devices 120 are one or more computing devices capable of receiving user input as well as transmitting and/or receiving data via the network 140. The client device 120 also has a display 122 capable of rendering content. In one embodiment, a client device 120 is a conventional computer system, such as a desktop or a laptop computer. Alternatively, a client device 120 may be a device having computer functionality, such as a personal digital assistant (PDA), a mobile telephone, a smartphone, or another suitable device. A client device 120 is configured to communicate via the network 140. In one embodiment, a client device 120 executes an application allowing a user of the client device 120 to interact with the online system 110. For example, a client device 120 executes a browser application to enable interaction between the client device 120 and the online system 110 via the network 140. In another embodiment, a client device 120 interacts with the online system 110 through an application running on a native operating system of the client device 110, such as IOS® or ANDROID™. In another embodiment, the client device 120 interacts with the online system through a voice application that receives and processes user commands through verbal interactions.

The client devices 120 are configured to communicate via the network 140, which may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

The content sponsor 130 is an entity that financially sponsors content uploaded to the online system 110 via the network 140. Examples of content sponsors 130 include businesses, educators, third-party marketing firms, or other types of advertisers. A content sponsor 130 provides content and monetary funds to sponsor the content by the online system 110. Examples of content include images, videos, interactive graphics, quizzes, any combination of the aforementioned, or any other content capable of being rendered by a display on a client device 120. In some embodiments, the content sponsor 130 has a content store 136 which maintains data and information associated with content belonging to the content sponsor.

The financial institution 150 maintains data and financial accounts 152 of parties involved in the system environment 100. Examples of a financial institution include a bank, an online payment service, or any other entity holding a deposit of monetary funds. The store of financial accounts 152 may comprise any type of account maintained by the financial institution, including checking accounts, savings accounts, investment accounts, loans, or any other account that carries a monetary value. A user may have multiple financial accounts 152. The financial accounts 152 may be maintained by different financial institutions 150.

The embodiment shown in FIG. 1 displays only one financial institution 150, but in various embodiments there may be many different financial institutions 150 interacting with the users 120, content sponsors 130, and online system 110 via the network 140. For example, a user may have a savings account with a first financial institution and a checking account with a second financial institution. The online system 110 may connect to both the first financial institution and the second financial institution in relation to the user.

In another example, the user 120 may have an account with a first bank while the content sponsor 130 has an account with a second bank. Monetary funds are withdrawn from the content sponsor's 130 account at the second bank and sent to the online system 110. When the client device 120 interacts with content from the content sponsor 130, the online system 110 may provide a payment to the user's account at the first bank. The online system 110 thus may provide a centralized mechanism for sending money that may be stored by a plurality of financial institutions 150. In this way, the online system 110 may maintain credentials for users of the online system 110 who may also have a verified identify with the financial institution 150 (e.g., when identity is verified at account opening). The user may also authenticate the user's identity with the financial institution 150 (e.g., by logging into a portal of the financial institution) to authenticate the user. This verification and credentials (e.g., with user identity) ensure that interactions with content are genuine user interactions rather than by automated scripts or bots. In addition, the identity information is not accessible by the content sponsors 130, permitting users to gain the benefit of such interactions with sponsored content without revealing their information, particularly sensitive financial information, to other entities.

In the embodiment depicted in FIG. 1, the online system 110 includes a store for user accounts 111, a store for content sponsor accounts 112, a verification module 114, a content store 116, and a code generator 118. In other embodiments the online system 110 may include more or fewer stores and modules, which may perform different functionality. The modules and stores of the online system 110 in sum provide the functionality of the online system 110, specifically compensating users for interacting with content provided by content sponsors.

The store of user accounts 111 maintains data and information the online system has associated with its users. Examples of information stored in the user accounts store 111 include name, username, password, other log-in credentials, user's financial institution (e.g., bank) account information and authentication data, demographic information (e.g., gender, geographic location, etc.), content preferences, risk reward threshold and other information specific to a particular user. In some embodiments, the balance of funds the user has accumulated from interacting with content is also maintained by the store of user accounts 111. In other embodiments, the funds are stored directly in the financial account 152 of the user within the financial institution 150. In one such an embodiment, the online system 110 coordinates with the financial institution 150 to deposit funds and lock the use of said funds until a threshold is reached by the user.

In embodiments where the online system coordinates with the financial institution, the financial institution establishes accounts that may be subject to regulation, deposit insurance, and include user verification. The funds accumulated by users may be held at the financial institution, such that the online system does not itself maintain customer accounts. The funds may be accumulated in a separate account at the financial institution as further discussed below. The separate account may also be in the user's name at the financial institution, such that funds sent after interacting with content are sent to the separate account. In this circumstance, funds provided for the user are always held by the user and in accounts subject to regulation and other requirements of the financial institution. This also permits the online system to coordinate content presentation and sponsorship from a variety of content sponsors while also allowing users to maintain the users' funds in a regulated and insured account. In addition, the online system may then coordinate across content sponsors and financial institutions and in embodiments does not need to incorporate additional systems to ensure compliance with relevant regulation and verification.

The store of content sponsor accounts 112 maintains data and information the online system has collected on content sponsors. Examples of information stored in the content sponsor accounts store 112 include content sponsor name, username, password, other log-in credentials, content sponsor bank account information, target-user demographic information (e.g., gender, geographic location, etc.), content preferences, risk reward threshold, and other information specific to a particular content sponsor. In some embodiments, the balance of funds the content sponsor has deposited for compensating users for interacting with content is also maintained by the store of content sponsor accounts 112.

The verification module 114 authenticates the identities of users 120 and content sponsors 130. For example, the verification module 114 provides a log-in mechanism that references the stores of user accounts 111 and content sponsor accounts 112. This may include a multi-step verification process to confirm identities and prevent access by bots. One embodiment of the verification module 114 links the online system 110 to an established financial institution account, such as a checking account, which may require a multi-factor authentication (MFA). In some embodiments, initially, user identities may be verified by financial institutions prior to establishing accounts, for example by verifying a passport, driver's license, national identity card, and so forth. In addition, the user interacting with the content may be authenticated as the person associated with the account. In some embodiments, the verification module 114 authenticates the identity of the user 120 after the user interacts with a content item and before the payment is deposited. Authentication by the verification module 114 may maintain the trustworthiness of the online system 110. That is, to ensure funds are being property disseminated to users 120 for successfully interacting with content and to ensure that automated systems do not falsify access to content.

The content store 116 maintains the content uploaded by the content sponsors and other data associated with the content. The content store 116 may include the content to be distributed (e.g., a particular image, video content, recorded audio, or any combination thereof) and may additionally include information about the users to whom the content may be distributed (e.g., targeting criteria), the value of an interaction, and a total budget for the application The code generator 118 generates a code for a content based on the content and related information. The code is added to the content when provided for display to a user to generate an indicator, which is displayed along with the rendering of the content item. In some embodiments, the code causes an icon to appear on a digital content. The icon or indicator may indicate that the content item is associated with a payment to users viewing or interacting with the content. When a limit has been met based on the code, the online system 110 removes the code from the digital content. A content sponsor can stipulate a limit of users who are paid for interacting with a particular content item. For example, a content sponsor may set a limit of 500 payments per day for a content item. If the total number of users who have interacted with the content item is less than 500, the code will generate the indicator icon, which allows users to interact with the content. When the number of users who have been paid for interacting with the content exceeds 500, the code will no longer generate the indicator icon. In various embodiments, the limit may be a time limit (e.g. a set time period during which the content is available), a total number of users (e.g. the content is available until a total of 10,000 users interact with it), a number of users over a particular time period (e.g. a monthly maximum number of users who can interact with the content), or any combination thereof.

Figure 2:
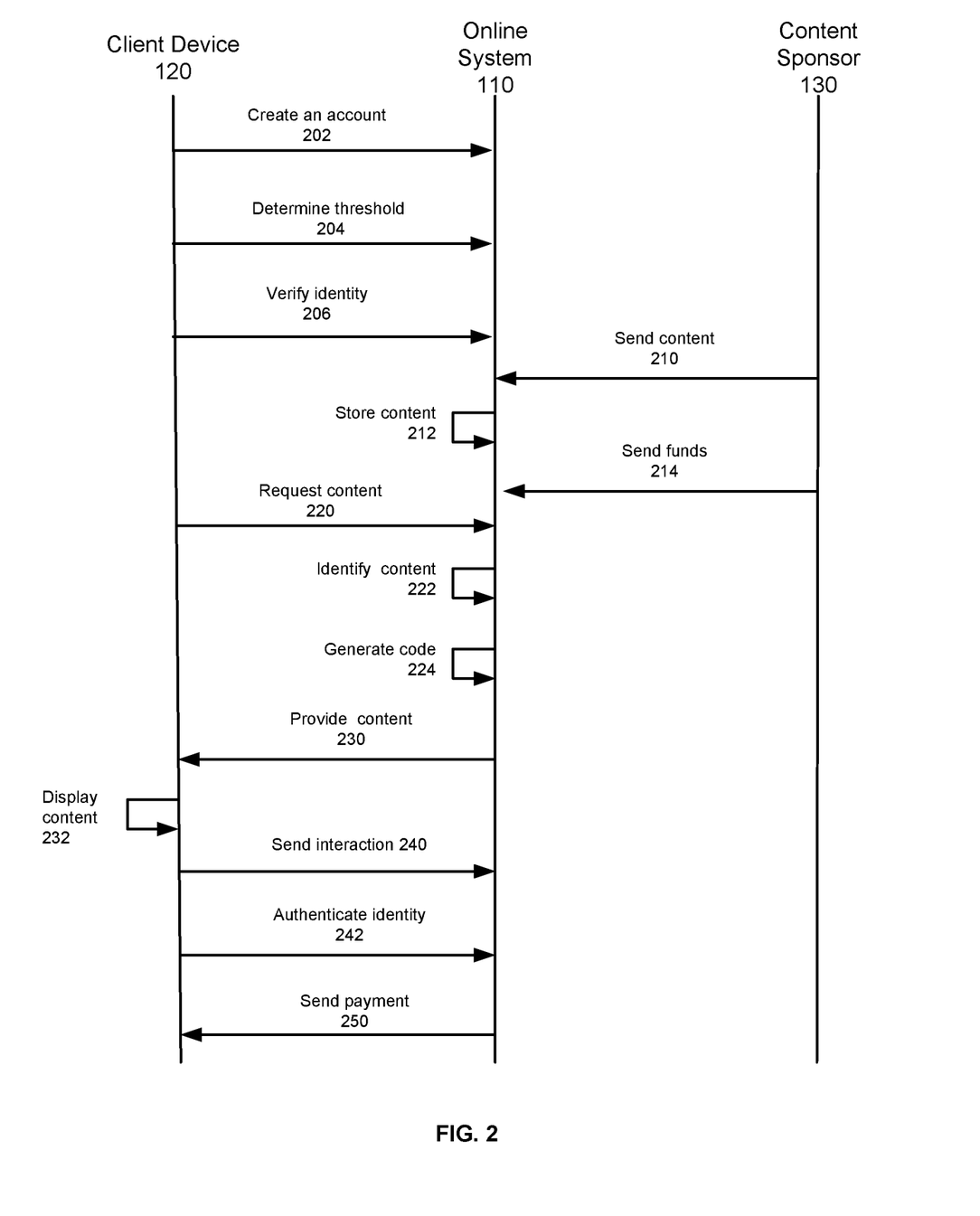
FIG. 2 is a sequence diagram of interactions between a client device, online system, and content sponsor, according to one or more embodiments.

FIG. 2 is a sequence diagram of interactions between a client device 120, online system 110, and content sponsor 130, according to one or more embodiments. The online system 110 in some embodiments provides a centralized platform such that the content sponsor 130 and user of the client device 120 do not interact directly. This protects the privacy and interests of both the user and the content sponsor 130, such that the user withholds financial and other personal information and credentials from individual content sponsors. In some embodiments, information about the content interacted with by users may be shared. For example, when the content relates to financial literacy, in some embodiments, information about the financial wellness and/or financial literacy of the user may be shared with content sponsors. The embodiment shown in FIG. 2 shows only one client device 120 and one content sponsor 130. The online system 110 can connect a plurality of users using a plurality of client devices to a plurality of content sponsors.

A user via the client device 120 creates 202 an account. In creating 202 the account the user sends various information to the online system 110, which includes personal information (e.g., name, email address, phone number) and financial institution information (e.g., name of financial institution, account number, other account information). Creating 202 an account also includes establishing account specific credentials including a username, a password, security questions and answers, and other credentials that may be part of a multi-step authentication process. In some embodiments the user may connect the account to their social media accounts.

In some embodiments, the user establishes an account with the financial institution, and the user may access the online system via the financial institution. For example, the user may access a webpage or portal at the financial institution, which may authenticate the user's login credentials to the financial institution (e.g., including multi-factor authentication). The user may access the online system via the financial institution, in which case the user's identity may be verified for the online system via the credentials provided to the financial institution to access the financial institution.

In some embodiments, the funds accrued by a user are not immediately accessible to the user and are kept in a segregated account until a specified value or time is reached. For example, when the content relates to financial literacy and the user is sponsored content that provides payment for a user to increase financial literacy, this may incentivize the user to continue to educate themselves until the segregated account is accessible. In this example, a user via the client device 120 may determine 204 a threshold for accessing the segregated account. The funds accumulated by the user are not available for spending until the user achieves the threshold. The threshold can be amount-based or time-based. In some embodiments the threshold may be selected automatically by the online system 110 and step 204 is skipped. In some embodiments, the user may specify their own threshold based upon their personal risk reward threshold. In other embodiments, the user can select from a set of pre-determined threshold options.

In one such embodiment, the user is establishing a savings plan and the threshold may represent a risk-reward tradeoff, which may be selected by a slider bar of risk and reward. The user selects a threshold as a savings goal for their account and selects the amount of risk and reward they prefer in reaching the savings goal. The reward for achieving the savings goal is based on the goal amount, length of time, frequency of deposits, or any combination of factors involved in achieving the savings goal. The user may be permitted to access the segregated account earlier than the established threshold by paying a monetary penalty. This may encourage positive savings behavior and inhibit attempts to access the account before a user's goal is reached. This penalty thus represents a 'risk' the user bears in accessing the account early. When the user selects the threshold via a slider, one end of the slider may represent no risk, which comes with no reward when the savings goal is met or penalty for accessing the account. On the other end of the slider, the user can get a maximum reward when the savings goal is met but will also get the maximum penalty if the user tries to access the funds prior to achieving their savings goal.

The user via the client device 120 verifies 206 their identity. The verification 206 occurs when the user creates or otherwise logs-in to their account. The verification 206 can take several different forms. In one embodiment, the user verifies 206 their identity to their financial institution via the online system 110. That is, the user provides their financial account credentials via the online system 110 to verify their identity to the financial institution and grant the online system 110 access to their financial account. This can take the form of the user logging into an online banking account via the interface of the online system 110.

The creation 202 of an account, determination 204 of a threshold, and verification of identity 206 may occur in any order or occur simultaneously.

The content sponsor 130 sends 210 content to the online system 110. The network 140 shown in the embodiment in FIG. 1 can be used to send 210 the content. The content sponsor 130 may send 210 the content by uploading the content via an online portal. Sending 210 the content also includes sending information relating to the content, such as a value for interacting with the content or related limits as previously described. The online system 110 stores 212 the content and related information, such as by the content store 116 of FIG. 1.

The content sponsor 130 also sends 212 monetary funds to the online system 110. The monetary funds are used to finance the sponsorship of the content by paying users to interact with the content. The content sponsor 130 can send 212 funds via online payment, check, direct debit, bank transfer, or any other method of payment. A financial institution, such as the financial institution 150 in FIG. 1, may send 212 the funds on behalf of the content sponsor 130. In the embodiment of FIG. 2 the funds are sent 212 after the content is sent 210. However, the funds may be sent before the content or the funds and content may be sent at the same time.

A client device 120 requests 220 content from the online system 110. In some embodiments, prior to requesting 220 content, the user must log in to their account with the online system 110. The request 220 is through a user portal and is sent via a network 140. In one example, the client device 120 has an application that connects to the online system 110. After logging in, the user can request 220 content via the application's user interface.

After receiving a request 220, the online system identifies 222 content that is suitable for the user to view. The online system 110 may use targeting criteria specified by the content sponsor 130, feedback on the content the user has previously viewed, and/or other methods to identify 222 content for the user to view. In one embodiment, the online system 110 automatically selects content for the user, such as by applying machine learning or other automated approaches to recommend content of interest to a user. In another embodiment, the user has more autonomy over the content they view and can search for and select particular content from a display or dashboard. The content displayed on the user's dashboard may be based on content the user previously watched, content newly uploaded to the online system 110, and other categories of organizing content. The user can also search for content, including key word search. In another embodiment, the user is presented with trending content and content viewed by their peers.

For example, in one embodiment, the online system 110 has a financial savings platform with multiple financial applications including a skill building application. The skill building application teaches users about financial literacy through content sponsored by financial institutions. Users are paid to learn about finances by interacting with content items within the skill building application. The users can make a financial plan and savings goals. In this example, since the payments are real currency, the sum of their balance can be used to achieve their savings goals. The online system recommends relevant content items to allow the users to continue their financial literacy education.

The skill building application also allows users to select a preferred learning pedagogy, such as a "Warren Buffet"

approach to wealth creation and investing or a "Jim Cramer" approach. There is also an approach entitled "What are my peers doing?" that allows a user to compare their financial status and planning to their peers. Recommendations to a user are improved over time via machine learning techniques tailored to the user's preferences for risk or reward and savings goals.

The embodiment also benefits the financial institutions sponsoring the financial literacy content. By providing education and exposure to the users, they are more likely to see the users turn to them for financial services. For example, a user may watch a series of videos on car loans from a particular bank. The user is more likely to turn to that bank if and when they decide to take out a car loan. The relatively small upfront investment of payments, such as micropayments, can have large returns to the bank when users employ their financial services.

An additional application related to the skill building application is a targeted offers platform. In one embodiment, the targeted offers platform takes the form of a link visible in the user interface. As a user works through a series financial literacy content items the content sponsors can present the user with special offers for their goods and services. These targeted offers are including but not limited to large monetary rewards for buying their goods and services. Returning to the car loan example, the bank can present the user with a targeted offer about their car loans, such as a monetary bonus or a lower interest rate.

The online system 110 also generates 224 a code based on the content and related information. The online system 110 can generate 224 the code using any of the methods discussed previously in relation to the code generator 118 of FIG. 1.

The online system 110 provides 230 the content to the client device 120. This is done by sending the content, the code, and any other related materials to the client device 120 via the network 140. The client device 120 then displays 232 the content by rendering the content on its display 122. In the application example from earlier, the interface of the application provides 230 and displays 232 the content to the user on the client device.

The user of the client device 120 may subsequently interact with the content to reflect that the user has actually engaged with the content. The interaction confirms that the user viewed the content and merits payment. The interaction can take the form of selecting one or more portions of the display, participating in an evaluation after viewing the content, or the user otherwise performing a communication with the online system 110. Confirmation of the interaction is sent 240 to the online system.

In addition to the interaction, the user must also authenticate 242 their identity to the online system 110. In some embodiments, the user verifies their identity when creating an account with the online system. The user may do so by verifying their identity to their financial institution via the online system. Such grants the online system access to their financial account within the financial institution. The user may be required to re-verify or otherwise authenticate their identity to the financial institution or online system prior to receiving monetary compensation for interacting with content. Additional details regarding methods of verification 242 are described in greater detail with respect to the verification module of FIG. 1.

The online system 110 sends 250 a payment to the client device 120. The payment compensates the user for their time interacting with the sponsored content item. The payment is financed by the monetary funds sent 214 by the content sponsor 130. In some embodiments, the payment is stored and accrued in an account by the online system 110 until the user accumulates to a threshold. The threshold is a predetermined value that can be amount-based (i.e. a specific account balance) or time-based (i.e. a specific period of time). In some embodiments, such as applications for financial literacy and wellness, the threshold is a savings goal for the user. Once the user accumulates funds beyond the threshold, the online system 110 facilitates the payment of the user in one sum. The online system 110 may send the user the payment through any conventional online payment method. In some embodiments, the user can withdraw funds accumulated prior to reaching the threshold. Withdrawing the funds prior to reaching the threshold comes at a penalty. The penalty is pre-defined and can take the form of a monetary cost or a forfeiture of a reward or bonus for which the user would otherwise be eligible.

Figure 3:
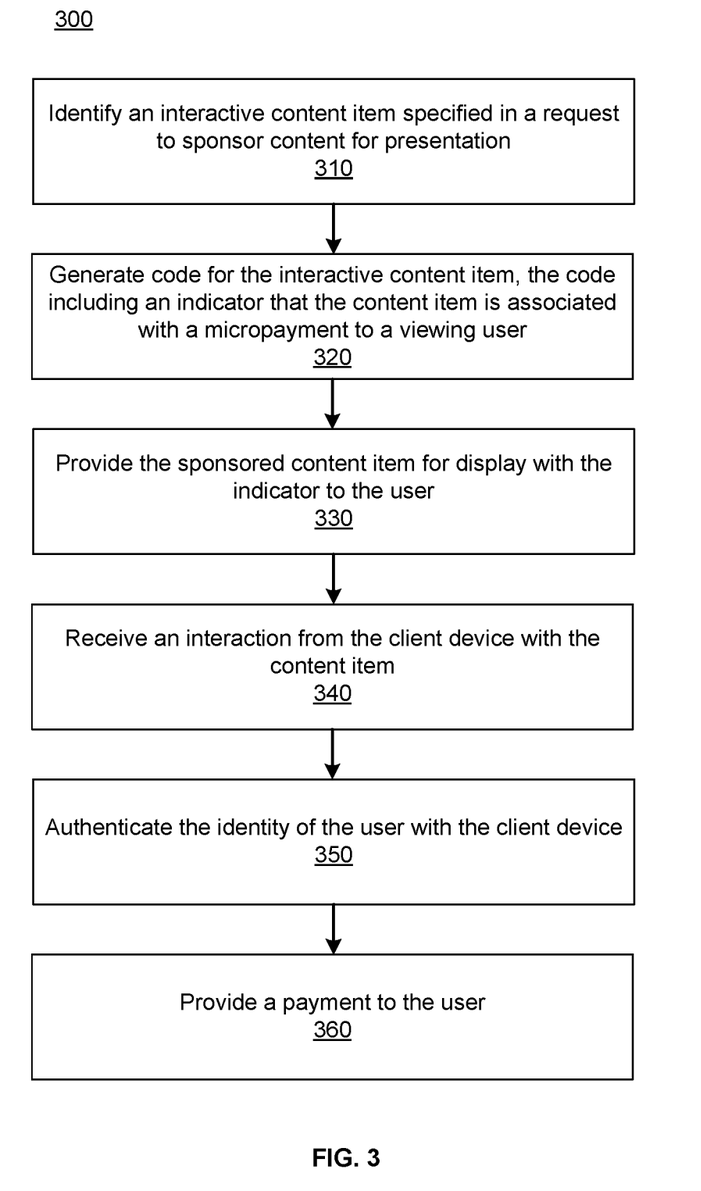
FIG. 3 is a flowchart illustrating a process for monitoring user interactions according to one or more embodiments.

FIG. 3 is a flowchart illustrating a process of connecting users with content from content sponsors by the online system, according to one or more embodiments. The process 300 may include different or additional steps than those described in conjunction with FIG. 3 in some embodiments or perform steps in different orders than the order described in conjunction with FIG. 3.

The online system identifies 310 an interactive content item specified in a request to sponsor content for presentation. The interactive content is uploaded and sponsored by a content sponsor. The interactive content item may take many forms, including but not limited to one or more images, video, interactive diagram, audio recording, any additional media, or any combination thereof. The content sponsor has the option to include an evaluation, such as a quiz on the content, which the viewing user must complete after interacting with the content and prior to receiving a payment. The content sponsor also specifies the exact amount the user is paid for interacting with the content item. The content sponsor finances the payments to the plurality of users who interact with the content.

The online system generates 320 a code for the interactive content item, the code including an indicator that the content item is associated with a payment to a viewing user. Payment is not available when there are not sufficient funds from the content sponsor to sponsor the content. Payment is also not available when the user has reached a pre-defined limit (i.e. has reached a limit in terms of number of content item interactions or funds accumulated for some period of time. Payment is also not available if the user has previously interacted with the same content.

In some embodiments, the indicator takes the form of a visual indicator. The code toggles the visual indicator between on and off when a monetary compensation (i.e. micropayment) is available to the user for viewing the content. For example, when the payment is available the code produces an indicator that displays a message such as "Ready to View" or may include a statement about the quantity of the payment, such as "Watch for $0.50." The user can select the indicator to begin interacting with the content. When the payment is not available, such as the daily threshold of viewers has been met or the content has run out of funds to sponsor payments, the code produces an indicator that conveys a message such as "Payment not available," "Daily limit reached, come back tomorrow," or else does not display an indicator at all (i.e. there is nowhere for the user to click to interact with the content). In another embodiment, the content is no longer displayed to the user when payment is not available. The information comprised in the code, and consequently the indicator, can be customized by the content sponsor. The content sponsor can design how their content is displayed to the user, including the display and text description of the indicator.

The online system provides 330 the interactive content item for display with the indicator to the user via a client device. In some embodiments, the content is provided by rendering it on an application programming interface (API) that includes a graphical user interface (GUI). The API may take the form of a mobile application, computer application, voice application, or other web-based system compatible with the online system. In another embodiment, the user interface may be presented via a website and associated web pages published by a web server associated with the online system and accessible by a network. The client device performs the task of rendering the content provided by the online system via a display.

The online system receives 340 an indication from the client device with the content item. The online system is capable of supporting a variety of indications, which can be specified by the content sponsor. The indication can take the form of the user selecting on a touch screen or otherwise performing a mouse event as they interact with the content item. The interaction may also take the form of answering a question or series of questions to confirm they viewed the content. Content sponsors may optionally include a quiz. The viewing user may optionally complete the quiz. However, failure to complete the quiz can result in the user foregoing being paid. The interaction can take the form of any communication between the user's client device and the online system to confirm that the user has viewed the content presented to them. The interaction has the added benefit of more effective and deeper engagement with the user than purely impression-based content presentation or where the user has the option to view content but no further incentive to do so.

The online system verifies 350 the identity of the user with the client device. The verification of the user's identity may not be further verified in embodiments in which the user was previously verified and authenticated. For example, if the user has already logged on or otherwise verified their identity with the online system or financial institution during a session, the user may not be required to verify their identity again. That is, the user's log-in may be maintained for more than one content item viewing. Similarly, the user may perform the verification step in a different order with respect to other steps than shown by the process 300 of FIG. 3. In some embodiments, the user can verify their identity by entering their log-in credentials, answer a personal verification question, enter a personal identification number (PIN), or otherwise completing a completely automated public Turing test to tell computers and humans apart (CAPTCHA). The verification step ensures the trustworthiness of the online system 110.

The online system provides 360 a payment, such as a micropayment, to the user. The payment is in the form of real currency, legal tender, or cryptocurrency. The payment is not gaming currency or other virtual credits which do not have value outside of the online system that distributes them. The user has a balance of total payments accumulated. When the balance accumulates to be greater than or equal to a threshold, the user can deposit the balance of their account to an account within a financial institution, such as a bank account. The use of a threshold before deposit to a financial institution reduces the friction of smaller payments and may further incentivize users to successfully save for the user's goals. This may be particularly effective in embodiments where the content includes financial literacy, such that the user both learns financial literacy and simultaneously sees the effect of saving towards a goal. The accumulation of payments may occur in real-time. That is, users can transfer funds to a financial institution in real-time as they reach the threshold. Some embodiments may not have a threshold balance. In other words, the threshold for transferring funds to a financial institution is zero.

Figure 4:
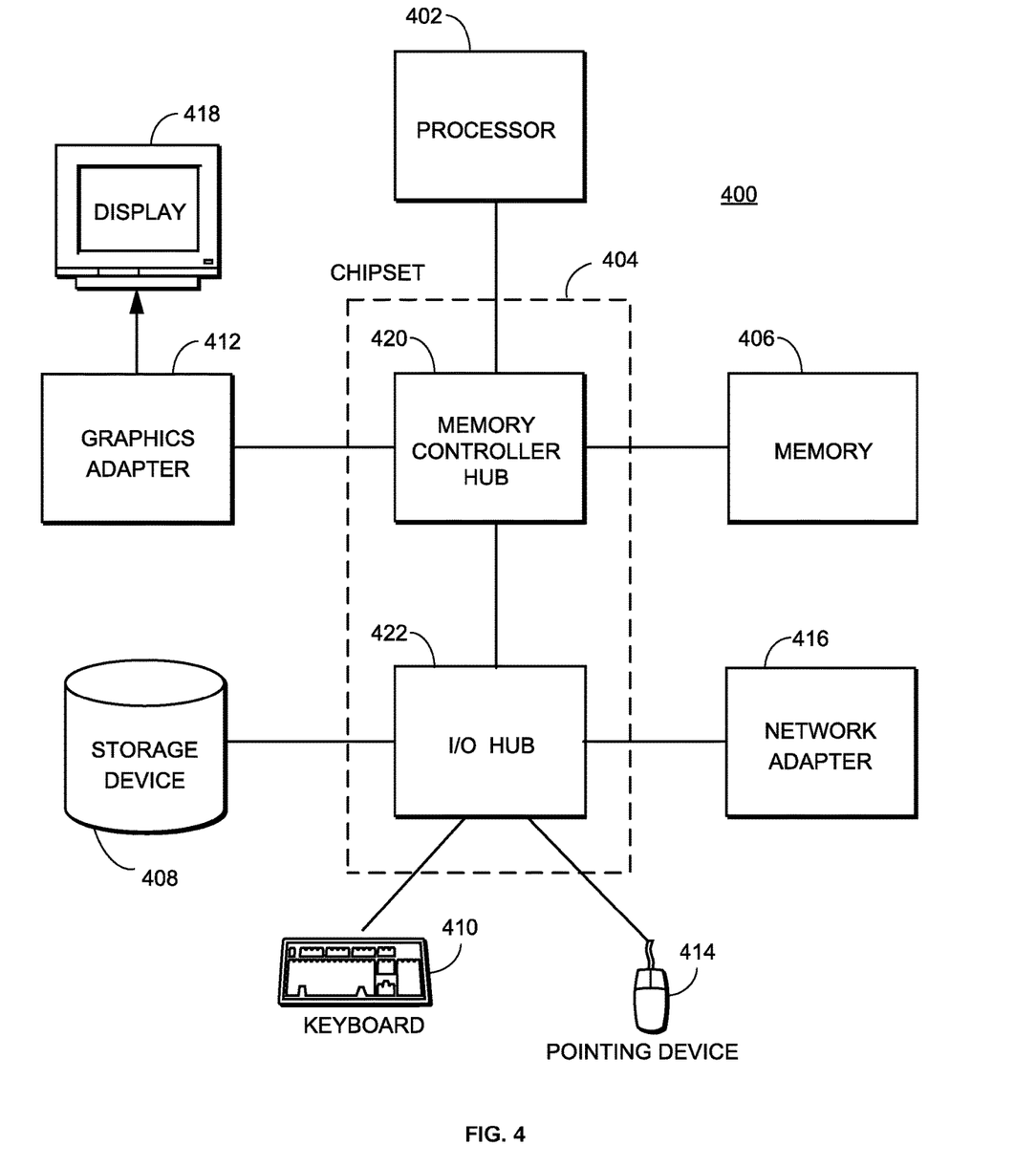
FIG. 4 is a high-level block diagram illustrating physical components of a computer used as part or all of one or more of the entities described herein according to one or more embodiments.

FIG. 4 is a high-level block diagram illustrating physical components of a computer 400 used as part or all of one or more of the computing systems described herein in one embodiment. Illustrated are at least one processor 402 coupled to a chipset 404. Also coupled to the chipset 404 are a memory 406, a storage device 408, a keyboard 410, a graphics adapter 412, a pointing device 414, and a network adapter 416. A display 418 is coupled to the graphics adapter 412. In one embodiment, the functionality of the chipset 404 is provided by a memory controller hub 420 and an I/O hub 422. In one embodiment, the memory 406 is coupled directly to the processor 402 instead of the chipset 404. In one embodiment, one or more sound devices (e.g., a loudspeaker, audio driver, etc.) is coupled to chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The pointing device 414 may be a mouse, track ball, or other type of pointing device, and is used in combination with the keyboard 410 to input data into the computer 400. The graphics adapter 412 displays images and other information on the display 418. The network adapter 416 couples the computer system to a local or wide area network.

As is known in the art, a computer 400 can have different and/or other components than those shown in FIG. 4. In addition, the computer 400 can lack certain illustrated components. In one embodiment, a computer 400 acting as a server may lack a keyboard 410, pointing device 414, graphics adapter 412, and/or display 418. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   identifying an interactive sponsored content item specified in a request from a content sponsor to sponsor content for presentation, the request including a limit on payment for the sponsored content item;
   generating code for association with the interactive sponsored content item, the code configured to indicate whether the limit on payment associated with the sponsored content item has been reached;
   determining the limit on payment associated with the sponsored content item has not been reached;
   generating, based on the code when the limit on payment associated with the sponsored content item has not been reached, an indicator for display with the sponsored content item indicating that interacting with the sponsored content item is associated with a payment to a user by the content sponsor;
   providing for display to the user on a client device the sponsored content item overlaid with the indicator;
   receiving an interaction from the client device with the content item;
   authenticating the identity of the user with the client device; and
   responsive to receiving the interaction and verifying the identity of the user, providing the payment to the user as specified in the associated request to sponsor presentation of content, the payment adding value to a financial institution account of the user.

2. The method of claim 1, further comprising:
   receiving a set of requests to sponsor presentation of content to users with direct payments to users viewing the content.

3. The method of claim 1, further comprising:
   responsive to receiving the interaction, providing an evaluation to the user measuring the user's knowledge related to subject matter of the sponsored content item; and
   responsive to the evaluation exceeding a threshold, providing the payment to the user.

4. The method of claim 1, further comprising:
   monitoring a total of payments associated with the request in relation to the limit on payments for the sponsored content item; and
   when the total of payments exceeds the limit on payment, removing the generated indicator from the interactive sponsored content item.

5. The method of claim 1, wherein an intermediary content provider provides the sponsored content item for display with the indicator to the user.

6. A non-transitory computer-readable medium, having instructions executable by a processor for:
   identifying an interactive sponsored content item specified in a request from a content sponsor to sponsor content for presentation, the request including a limit on payment for the sponsored content item;
   generating code for association with the interactive sponsored content item, the code configured to indicate whether the limit on payment associated with the sponsored content item has been reached;
   determining the limit on payment associated with the sponsored content item has not been reached;
   generating, based on the code when the limit on payment associated with the sponsored content item has not been reached, an indicator for display with the sponsored content item indicating that interacting with the sponsored content item is associated with a payment to a user by the content sponsor;
   providing for display to the user on a client device the sponsored content item overlaid with the indicator;
   receiving an interaction from the client device with the content item;
   authenticating the identity of the user with the client device; and
   responsive to receiving the interaction and verifying the identity of the user, providing the payment to the user as specified in the associated request to sponsor presentation of content, the payment adding value to a financial institution account of the user.

7. The computer-readable medium of claim 6, the instructions further executable by the processor for:
   receiving a set of requests to sponsor presentation of content to users with direct payments to users viewing the content.

8. The computer-readable medium of claim 6, the instructions further executable by the processor for:
   responsive to receiving the interaction, providing an evaluation to the user measuring the user's knowledge related to subject matter of the sponsored content item; and responsive to the evaluation exceeding a threshold, providing the payment to the user.

9. The computer-readable medium of claim 6, the instructions further executable by the processor for:
monitoring a total of payments associated with the request in relation to the limit on payments for the sponsored content item; and
when the total of payments exceeds the limit on payment, removing the generated indicator from the interactive sponsored content item.

10. The computer-readable medium of claim 6, wherein an intermediary content provider provides the sponsored content item for display with the indicator to the user.

11. A system comprising:
a processor; and
a non-transitory computer-readable medium having instructions executable by the processor for:
identifying an interactive sponsored content item specified in a request from a content sponsor to sponsor content for presentation, the request including a limit on payment for the sponsored content item;
generating code for association with the interactive sponsored content item, the code configured to indicate whether the limit on payment associated with the sponsored content item has been reached;
determining the limit on payment associated with the sponsored content item has not been reached;
generating, based on the code when the limit on payment associated with the sponsored content item has not been reached, an indicator for display with the sponsored content item indicating that interacting with the sponsored content item is associated with a payment to a user by the content sponsor;
providing for display to the user on a client device the sponsored content item overlaid with the indicator;
receiving an interaction from the client device with the content item;
authenticating the identity of the user with the client device; and
responsive to receiving the interaction and verifying the identity of the user, providing the payment to the user as specified in the associated request to sponsor presentation of content, the payment adding value to a financial institution account of the user.

12. The system of claim 11, the instructions further executable by the processor for:
receiving a set of requests to sponsor presentation of content to users with direct payments to users viewing the content.

13. The system of claim 11, the instructions further executable by the processor for:
responsive to receiving the interaction, providing an evaluation to the user measuring the user's knowledge related to subject matter of the sponsored content item; and
responsive to the evaluation exceeding a threshold, providing the payment to the user.

14. The system of claim 11, the instructions further executable by the processor for:
monitoring a total of payments associated with the request in relation to the limit on payments for the sponsored content item; and
when the total of payments exceeds the limit on payment, removing the generated indicator from the interactive sponsored content item.

15. The system of claim 11, wherein an intermediary content provider provides the sponsored content item for display with the indicator to the user.

* * * * *